US009486950B2

(12) United States Patent
Hwang et al.

(10) Patent No.: US 9,486,950 B2
(45) Date of Patent: Nov. 8, 2016

(54) METHOD OF MANUFACTURING PROTECTIVE WINDOW AND DISPLAY DEVICE PRODUCED BY USING THE SAME

(71) Applicant: SAMSUNG DISPLAY CO., LTD., Yongin, Gyeonggi-do (KR)

(72) Inventors: Seong-Jin Hwang, Yongin (KR); Kwan-Young Han, Yongin (KR); Hyoung-Suk Roh, Yongin (KR); Mikiya Itakura, Yongin (KR); Yuki Hongo, Yongin (KR); Hun-Kyo Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 419 days.

(21) Appl. No.: 14/109,055

(22) Filed: Dec. 17, 2013

(65) Prior Publication Data
US 2014/0376237 A1 Dec. 25, 2014

(30) Foreign Application Priority Data

Jun. 21, 2013 (KR) .......... 10-2013-0071847

(51) Int. Cl.
B29C 45/16 (2006.01)
B29C 45/14 (2006.01)
B29K 669/00 (2006.01)
B29L 31/34 (2006.01)
B29K 667/00 (2006.01)

(52) U.S. Cl.
CPC ....... B29C 45/1679 (2013.01); B29C 45/1418 (2013.01); B29C 45/14811 (2013.01); B29K 2623/06 (2013.01); B29K 2633/12 (2013.01); B29K 2667/003 (2013.01); B29K 2669/00 (2013.01); B29K 2995/002 (2013.01); B29K 2995/007 (2013.01); B29L 2031/3475 (2013.01)

(58) Field of Classification Search
CPC .............. B29C 45/1418; B29C 45/14811; B29C 45/1679
See application file for complete search history.

(56) References Cited

U.S. PATENT DOCUMENTS

| 2006/0012889 | A1* | 1/2006 | Kojima | ............. B29C 39/10 359/741 |
| 2013/0171417 | A1* | 7/2013 | Zou | ............. B32B 7/12 428/166 |
| 2016/0075057 | A1* | 3/2016 | Yamazawa | ........ C08F 222/1006 428/339 |

FOREIGN PATENT DOCUMENTS

| KR | 10-2005-0106447 | 11/2005 |
| KR | 10-2007-0025205 | 3/2007 |
| KR | 10-2010-0070678 | 6/2010 |
| KR | 10-0969192 | 7/2010 |
| KR | 10-1121449 | 3/2012 |
| WO | WO 2004/085102 | 10/2004 |

OTHER PUBLICATIONS http://www.etnews.com/news/device/device/2522294_1479.html (English Translation), Internet News Dated Nov. 10, 2011.
http://www.etnews.com/news/device/device/2522294_1479.html (Korean Version), Internet News Dated Nov. 10, 2011.

* cited by examiner

Primary Examiner — Thomas M Sember
(74) Attorney, Agent, or Firm — F. Chau & Associates, LLC

(57) ABSTRACT

A display device includes preparing a high hardness film. In the high hardness film, a first supporting member, a silsesquioxane film, and a second supporting member are deposited. The high hardness film is pre-treated, forming a pre-window. A transparent member is formed on a surface of the pre-window through an injection process. The transparent member is formed of polycarbonate. The first supporting member and the second supporting member are formed of polyethylene terephthalate or polyethylene naphthalate.

10 Claims, 6 Drawing Sheets

METHOD OF MANUFACTURING PROTECTIVE WINDOW AND DISPLAY DEVICE PRODUCED BY USING THE SAME

CROSS-REFERENCE TO RELATED PATENT APPLICATIONS

This application claims priority under 35 U.S.C. §119 to Korean Patent Application No. 10-2013-0071847 filed in the Korean Intellectual Property Office on Jun. 21, 2013, the disclosure of which is incorporated by reference herein in its entirety.

TECHNICAL FIELD

Exemplary embodiments of the present invention relate generally to displays, and more specifically, to a method of manufacturing a protective window and a display device produced by using the same.

DISCUSSION OF THE RELATED ART

A transparent protective window is used to protect a display panel from an external impact.

The protective window is positioned outermost of the electronic device such that it must be formed of a material having strong resistance against external impact.

Tempered glass may be used as a material for the protective window. However, the use of tempered glass may increase the weight and thickness of the display panel. Moreover, tempered glass is difficult to form into various shapes.

SUMMARY

A display device according to an exemplary embodiment of the present invention includes preparing a high hardness film. In the high hardness film, a first supporting member, a silsesquioxane film, and a second supporting member are deposited. The high hardness film is pre-treated, forming a pre-window. A transparent member is formed of polycarbonate. The transparent member is formed on a surface of the pre-window through an injection process. The first supporting member and the second supporting member are formed of polyethylene terephthalate or polyethylene naphthalate.

The pre-treating may be performed in a vacuum state. The high hardness film is heated, and the high hardness film is mounted on a jig.

The pre-window may include a curved surface.

The pre-treating may be performed in a vacuum state. A contact film is heated, and the high hardness film is mounted on the jig and contacts the contact film.

The pre-window may include a curved surface.

The pre-treating may be performed at a temperature of from about 250° C. to about 500° C.

A display device according to an exemplary embodiment of the present invention includes a display panel. The display panel includes a display unit for displaying an image. A protective window is positioned on the display panel. The protective window includes a flat surface corresponding to a display area of the display panel and a curved surface corresponding to an edge of the display panel. The protective window includes a first transparent member formed of polycarbonate. A second transparent member is positioned on the first transparent member. The second transparent member is formed of polyethylene terephthalate or polyethylene naphthalate. A third transparent member is positioned on the second transparent member. The third transparent member is formed of silsesquioxane.

The display panel may include an organic light emitting element.

A hard coating layer may be positioned between the second transparent member and the third transparent member.

The thickness of the first transparent member may be in a range of about 0.4 mm to about 1 mm. The thickness of the second transparent member may be in a range of about 38 μm to about 100 μm. The thickness of the third transparent member may be in a range of about 75 μm to about 150 μm.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
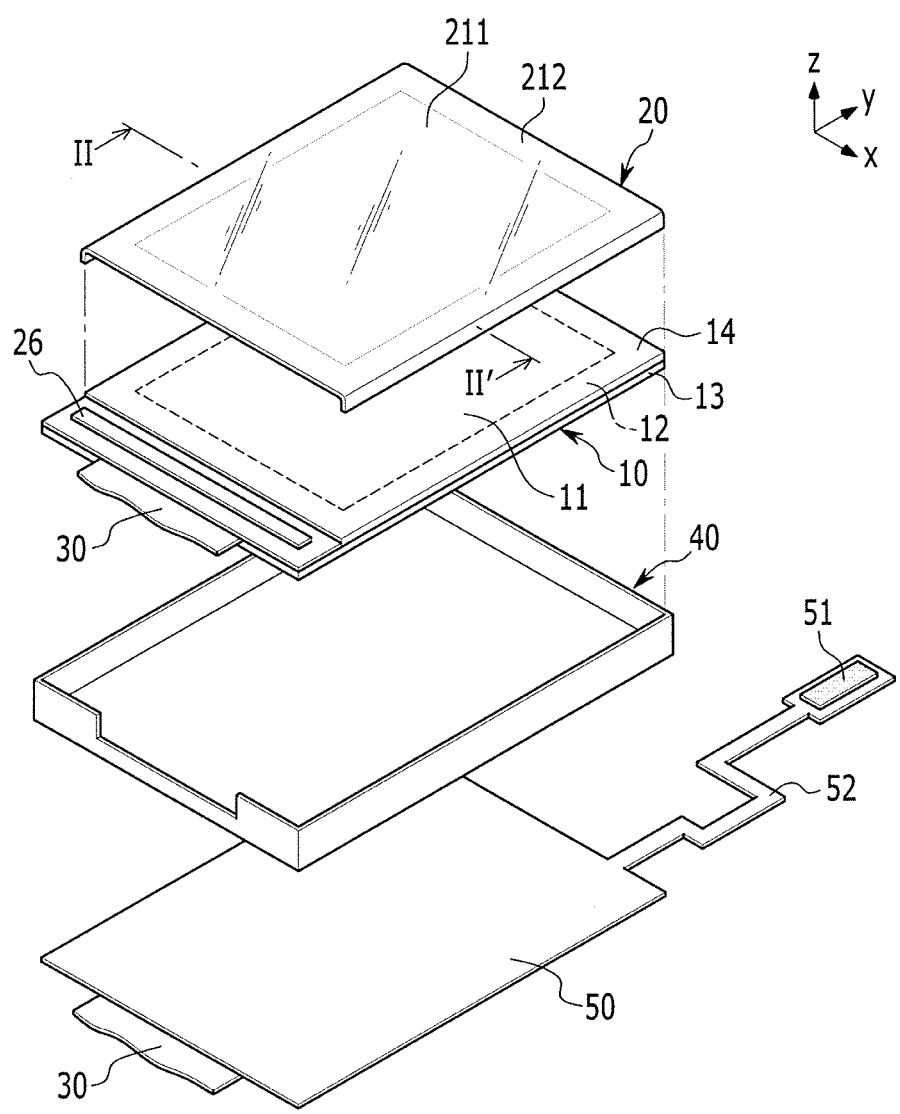
FIG. 1 is an exploded perspective view of a display device according to an exemplary embodiment of the present invention.

Exemplary embodiments of the present invention will be described in more detail hereinafter with reference to the accompanying drawings. The present invention, however, may be modified in various different ways, and should not be construed as limited to the embodiments set forth herein.

Like reference numerals may denote like or similar elements throughout the specification and the drawings. It will be understood that when an element such as a layer, film, region, or substrate is referred to as being "on," "coupled to," or "connected to" another element, it can be directly on or coupled or connected to the other element or intervening elements may also be present. As used herein, the singular forms "a," "an," and "the" are intended to include the plural forms as well, unless the context clearly indicates otherwise.

FIG. 1 is an exploded perspective view of a display device according to an exemplary embodiment of the present invention.

As shown in FIG. 1, a display device 100 includes a display panel 10 for displaying an image, a housing 40 for receiving the display panel 10, and a protective window 20 for protecting the display panel 10. The protective window 20 is disposed at a front side of the display panel 10.

The display panel 10 may be an organic light emitting display panel. Alternatively, the display panel 10 may be a liquid crystal display panel. In an exemplary embodiment of the present invention, an organic light emitting display panel is described as an example of the display panel 10 for the purpose of description, but exemplary embodiments of the present invention is not limited thereto.

The display panel 10 is electrically connected to a printed circuit board (PCB) 50 through a flexible printed circuit 30.

Pixels for expressing an image are arranged in a matrix form on a first substrate 13 of the display panel 10. A second substrate 14 is bonded to the first substrate 13 through a sealing member, protecting the pixels. The first substrate 13 may be a rear substrate, and the second substrate 14 may be a front substrate.

For example, in an active matrix organic light emitting display panel, each pixel includes an organic light emitting element and a driving circuit unit. The organic light emitting element includes an anode electrode, an organic light emitting layer, and a cathode electrode. The driving circuit unit drives the organic light emitting element. The driving circuit unit may include a thin film transistor (TFT). A data line is connected to an input terminal of the TFT, and a gate line is connected to a control terminal of the TFT. The anode electrode or the cathode electrode of organic light emitting element is connected to an output terminal of the TFT.

The data line and the gate line connected to the thin film transistor are connected to the flexible printed circuit (FPC) 50 through the flexible printing circuit 30. A signal is input to the input terminal and the control terminal of the TFT through the flexible printed circuit (FPC) 50. The TFT is turned on or off according to the signal and thus an electrical signal for driving the pixel is output to the output terminal of the TFT.

The driving circuit unit 26 generates a timing signal for applying a driving signal transmitted through the flexible printed circuit (FPC) 50 to the gate line and the data line at a predetermined time. The driving circuit unit 26 is formed on the first substrate 13 in the form of an integrated circuit (IC). Alternatively, the driving circuit unit 26 may be integrated with the pixel circuit on the substrate 13.

The flexible printed circuit (FPC) 50 includes electrical elements for processing a driving signal, a connector 51 to which an external signal is input, and an expansion 52. The external signal input through the connector 51 is transmitted to the electronic elements of the flexible printed circuit (FPC) 50 through the expansion 52.

The protective window 20 protects the display panel 10 from an external impact. The protective window 20 is positioned in front of the display panel 10. The protective window 20 may be made of a polymer.

The display panel 10 and the protective window 20 may be adhered to each other by an adhesive layer.

The protective window 20 includes a transparent portion 211 and a non-transparent portion 212. The transparent portion 211 corresponds to a display area 11 which has pixels and displays an image. The transparent portion 211 is formed of a transparent material that allows an image to be viewed from the outside. The non-transparent portion 212 encloses the transparent portion 211. The non-transparent portion 212 corresponds to a non-display area 12 where no image is displayed. The non-display area 12 allows the driving circuit and wires not to be viewed from the outside. The non-transparent portion 212 may include a logo of the display apparatus, a decorative pattern, or the like.

The protective window 20 includes a first flat surface corresponding to the display area 11 of the display panel 10 and a second flat surface corresponding to the side surface of the display panel 10. The protective window 20 also includes a curved surface with a predetermined curvature. The curved surface connects the first flat surface with the second flat surface and wraps an edge of the display panel 10.

In an exemplary embodiment of the present invention, curved surfaces are positioned at two opposite sides of the first flat surface. Alternatively, only one curved surface may be positioned at one of the two opposite sides of the first flat surface.

The protective window 20 may include a plurality of layers.

Figure 2:
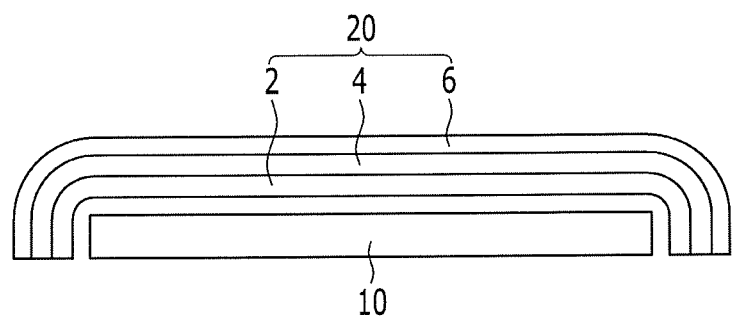
FIG. 2 is a cross-sectional view taken along line II-II' of FIG. 1, according to an exemplary embodiment of the present invention.

FIG. 2 is a cross-sectional view taken along line II-II' of FIG. 1, according to an exemplary embodiment of the present invention.

As shown in FIG. 2, the protective window 20 includes a first transparent member 2, a second transparent member 4, and a third transparent member 6 that are sequentially deposited.

The first transparent member 2 is made of polycarbonate (PC) and may have a thickness of about 0.4 mm to about 1 mm.

The second transparent member 4 may be made of polyethylene terephthalate (PET) or polyethylene naphthalate (PEN) and may have a thickness of about 38 μm to about 100 μm.

The third transparent member 6 is made of a silsesquioxane and may have a thickness of about 75 μm to about 150 μm. The third transparent member 6 is physically coupled to the second transparent member 4. The surface of the second transparent member 4 is treated with nanoparticles and thus the second transparent member 4 may be easily separated from the third transparent member 6.

Among the structural units of M, D, T, and Q as shown in Table 1, silsesquioxanes are a polymer including the T unit and may be represented by the general equation $(RSiO_{3/2})_n$. Silsesquioxanes may be generated by hydrolytic polymerization of trialkoxysilane $(RSiOR)_3$ or trichlorosilane $(RSiCl_3)$. In an exemplary embodiment of the present invention, silsesquioxanes may be generated by a method known to a person of ordinary skill in the art, in addition to the hydrolytic polymerization.

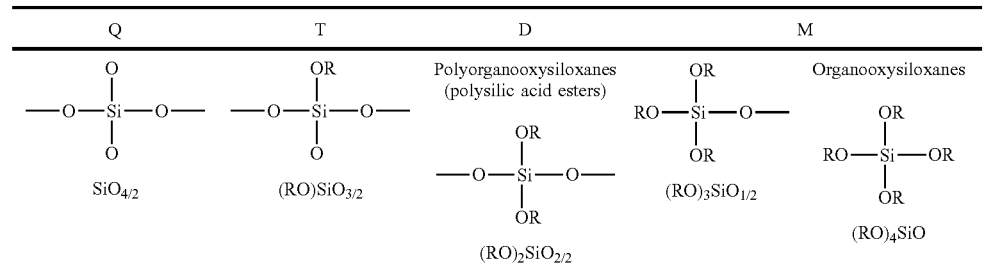

-continued

| Q | T | D | M |
|---|---|---|---|
| | R<br>\|<br>—O—Si—O—<br>\|<br>O<br><br>RSiO$_{3/2}$ | Polyorganooxysiloxanes (Silicone)<br><br>R<br>\|<br>—O—Si—O—<br>\|<br>R<br><br>R$_2$SiO$_{2/2}$ | R<br>\|<br>R—Si—O—<br>\|<br>R<br><br>R$_3$SiO$_{1/2}$ | Organooxysiloxanes<br><br>R<br>\|<br>R—Si—R<br>\|<br>R<br><br>R$_4$Si |

Figure 3:
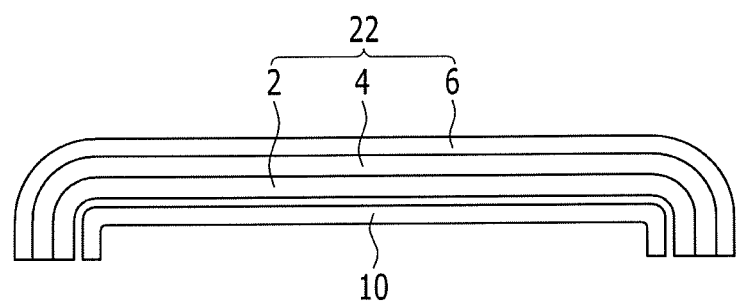
FIG. 3 and FIG. 4 are cross-sectional views of protective windows according to exemplary embodiments of the present invention.
Figure 4:
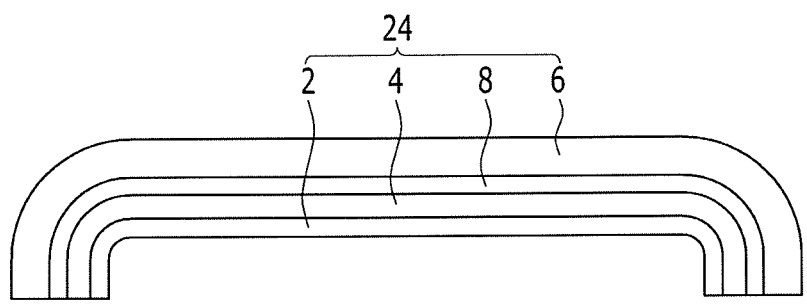

FIG. 3 and FIG. 4 are cross-sectional views of protective windows according to exemplary embodiments of the present invention.

As shown in FIG. 3, a protective window 22 includes a first transparent member 2, a second transparent member 4, and a third transparent member 6.

The protective window 22 may be substantially identical to the protective window 20 shown in FIG. 2. For example, the first to third transparent members 2, 3, and 6 of the protective window 22 may be substantially the same in material and thickness as the first to third transparent members 2, 3, and 6, respectively, of the protective window 20.

The overall protective window 22 may be formed of a transparent material without a non-transparent portion. When the entire protective window 22 is made of a transparent material, the pixel area of the display panel 10 may be expanded to the side of the display panel 10, increasing the display area. The display panel 10 may have bends like the protective window 22.

Alternatively, when the protective window 22 includes only one curved surface, the display panel 10 may have one bend corresponding to the curved surface of the protective window 22.

As shown in FIG. 4, a protective window 24 includes a first transparent member 2, a second transparent member 4, a third transparent member 6, and a hard coating layer 8. The hard coating layer 8 is positioned between the second transparent member 4 and the third transparent member 6.

The hard coating layer 8 may be made of an organic-inorganic complex material, such as a PMMA (polymethylmethacrylate)-based material. The hard coating layer 8 increases the strength of the protective window 20.

A method of manufacturing a protective window according to an exemplary embodiment of the present invention is described in detail with reference to FIG. 5 to FIG. 9.

Figure 5:
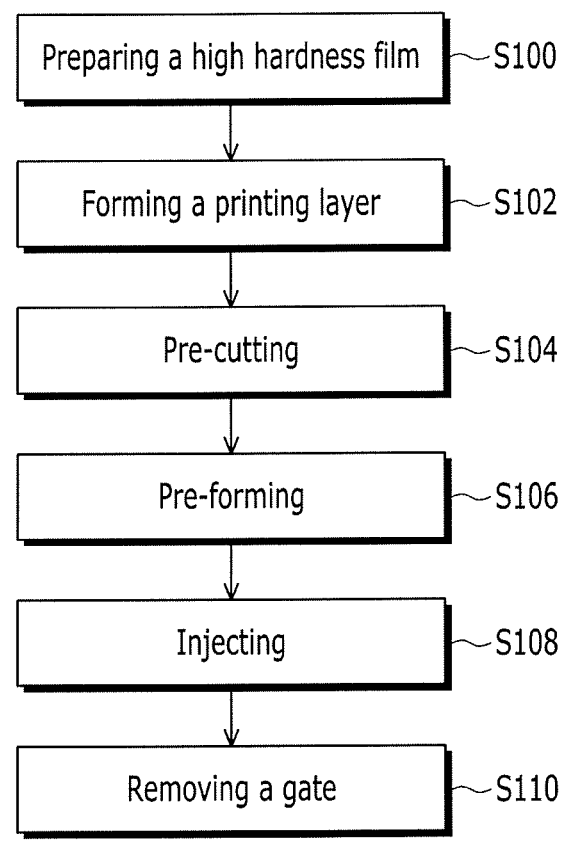
FIG. 5 is a flowchart of a method of manufacturing a protective window according to an exemplary embodiment of the present invention.

FIG. 5 is a flowchart of a method of manufacturing a protective window according to an exemplary embodiment of the present invention, and FIG. 6 to FIG. 9 are cross-sectional views of intermediate steps of a method of manufacturing a protective window according to an exemplary embodiment.

As shown in FIG. 5, a method of manufacturing a protective window according to an exemplary embodiment of the present invention includes preparing a high hardness film (S100), forming a printing layer on the high hardness film (S102), pre-cutting the high hardness film (S104), pre-treating the high hardness film (S106), injecting the window (S108), and removing a gate (S110).

Figure 6:
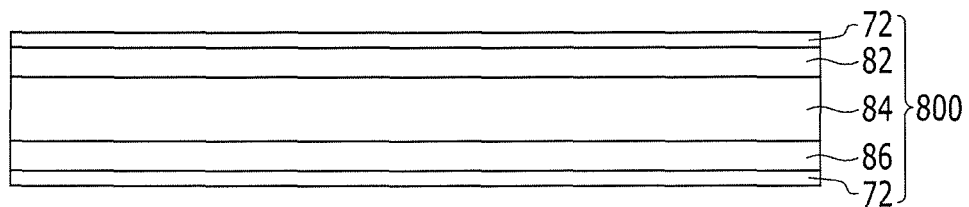
FIG. 6 to FIG. 9 are cross-sectional views of intermediate steps of a method of manufacturing a protective window according to an exemplary embodiment of the present invention.

As shown in FIG. 6, the high hardness film 800 is prepared (S100). The high hardness film 800 includes a silsesquioxane film 84, a first supporting film 82, and a second supporting film 86. The silsesquioxane film 84 is made of a silsesquioxane. The first supporting film 82 and the second supporting film 86 are attached to two opposite surfaces, respectively, of the silsesquioxane film 84. A protective film 72 made of polyethylene (PE) is attached to each of the first supporting film 82 and the second supporting film 86.

The first supporting film 82 and the second supporting film 86 prevent oxygen from flowing into the silsesquioxane film 84, thus preventing the silsesquioxane film 84 from being decomposed. The first and second supporting films 82 and 86 support the silsesquioxane film 84 during the pre-treating S106, preventing the silsesquioxane film 84 from being broken.

The first supporting film 82 and the second supporting film 86 are formed of a material having a high elastic coefficient and strong impact resistance, such as, for example, PET or PEN.

The second supporting film 86 and the silsesquioxane film 84 are coupled to each other by an adhesive, and the first supporting film 82 and the silsesquioxane film 84 are physically coupled to each other. The type of adhesive is not particularly limited. For example, the adhesive may include a material having high transparency, high weather resistance, and good thermal resistance, such as, for example, an acryl-based adhesive.

When the first supporting film 82 and the second supporting film 86 each have a thickness of less than about 38 μm, the high hardness film 800, after formed, might not maintain its shape due to the strength of the silsesquioxane film 84. When the first and second supporting films 82 and 86 each have a thickness of more than about 188 μm, the high hardness film 800 may be difficult to form due to the strength of the silsesquioxane film 84, the first supporting film 82, and the second supporting film 86, and thus, the first supporting film 82 may be peeled off or the silsesquioxane film 84 may be damaged. According to an exemplary embodiment of the present invention, the first supporting film 82 and the second supporting film 86 each may have a thickness of from about 50 μm to about 100 μm, and the first supporting film 82 and the second supporting film 86 have substantially the same thickness.

When the silsesquioxane film 84 has a thickness of less than about 75 μm, its corresponding pencil hardness is decreased to less than about 8H and its surface flatness might not be maintained. When the thickness of the silsesquioxane film 84 exceeds about 125 μm, the strength of the silsesquioxane film 84 is increased, and thus, the silsesquioxane film 84 may be difficult to form. According to an exemplary embodiment of the present invention, the silsesquioxane film 84 has a thickness of from about 75 μm to about 125 μm.

Figure 7:
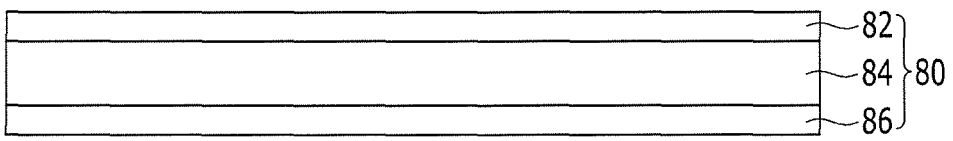

As shown in FIG. 7, the protective films 72 are removed. A printing layer is formed on an exposed surface of the first supporting film 82 (S102). The printing layer may have a black matrix that covers the non-display area of the display panel 10. The printing layer may also include may include a logo of the display device 100, a decorative pattern, or the like.

The printing layer may be formed by various methods using, e.g., a pad printer and a silk screen printer and may be dried. A printing ink may include a mixture of a color ink and a binder that allows the printing layer to be adhered to the resin layer without being pushed to a resin that is inserted in a subsequent injection process. The binder may be a PMMA-based or a PC-based material.

The high hardness film 800 is cut to a larger size than a size of a window 20 to be formed later (S104).

Figure 8:
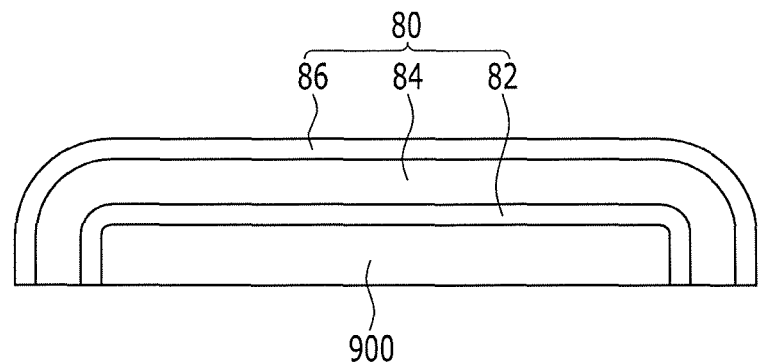

As shown in FIG. 8, the cut high hardness film 800 is pre-treated into a window shape by using a pre-treating jig 900 (S106). The pre-treating may be performed by a vacuum forming or pressure air forming method.

In the vacuum forming method, the high hardness film 800 is fixed to a clamp, and a heater is then disposed on or under the high hardness film 800, heating and softening the high hardness film 800. The heating is performed at a temperature of from about 250° C. to about 500° C. for about 5 seconds to about 10 seconds. When the temperature is more than about 500° C., the first and second supporting members 82 and 86 are crystallized and thus their strength is increased. Therefore, the silsesquioxane film 84 may be damaged and its thermal deformation may be difficult.

The heater is then removed. The high hardness film 800 is mounted on the jig 900, and under a vacuum state, the pre-treating S106 is performed. By the pre-treating S106, the high hardness film 800 is brought in tight contact with the surface of the jig 900 and thus has substantially the same shape as the surface of the jig 900, thus forming a pre-window 80. The pre-window 80 is cooled and then separated from the jig 900. The jig 900 includes curved portions and thus the pre-window 80 is rendered to have curved surfaces corresponding to the curved portions of the jig 900.

In the pressure air forming method, high pressure air is jetted to the high hardness film 800 under the vacuum state. The high hardness film 800 is thus rendered brought in tight contact with the surface of the jig 900, forming a pre-window 80. The pre-window 80 is cooled and separated from the jig 900.

After mounting the high hardness film 800 to the jig 900, a contact film is heated and then attached to the high hardness film 800, and while the vacuum state is maintained, the pre-treating may be performed. The contact film may be a silicon film such as ABS (acrylonitrile butadiene styrene copolymer), ABS/PC, and PET that reversibly reacts according to temperature. The contact film is heated for 5 seconds at a temperature of about 250° C. to about 500° C. and is attached to the high hardness film 800.

The contact film covers the high hardness film 800 and thus air between the high hardness film 800 and the jig 900 is exhausted and then the vacuum state is formed when the high hardness film 800 contacts the jig 900. Accordingly, the high hardness film 800 may tightly contact the jig 900.

According to an exemplary embodiment of the present invention, the first supporting member 82 and the second supporting member 86 are attached to two opposite surfaces, respectively, of the silsesquioxane film 84. Accordingly, even when the silsesquioxane film 84 that is highly brittle is bent to form the curved surface, the silsesquioxane film 84 is supported by the first supporting member 82 and the second supporting member 84 and the curved surface may be formed without damaging the silsesquioxane film 84.

Figure 9:
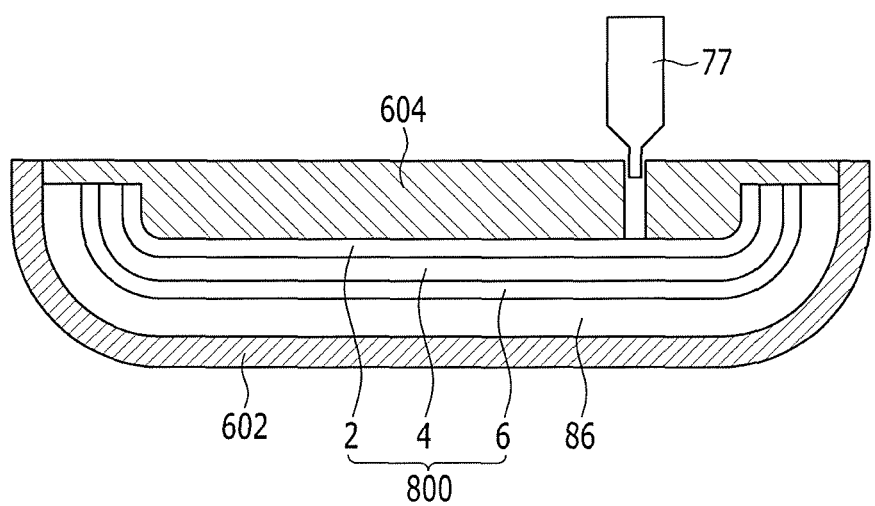

As shown in FIG. 9, a window may be formed by the injection process S108 using a lower mold 602 and an upper mold 604 that are engaged with each other (S108). The inside of the lower mold 602 and the mold 604 has the shape of the window to be formed, and the pre-window 80 is mounted between the upper mold 604 and the lower mold 602. The upper mold 604 and the pre-window 80 may be spaced apart from each other by the thickness of the first transparent member 2 of FIG. 1.

A predetermined amount of resin 77 is injected into a gap between the pre-window 80 and the upper mold 604. The amount of the injected resin 77 may be adjusted according to the thickness of the first transparent member 2.

The injected resin 77 is hardened, forming a protective window 20 including the first transparent member 2. The first supporting member 82 of the pre-window 80 corresponds to the second transparent member 4 of FIG. 2, and the silsesquioxane film 84 corresponds to the third transparent member 6 of FIG. 2.

When the window 20 is formed by the injection process, a protruding portion (also referred to as a "gate") is formed at a position where the resin 77 is injected. The protruded portion is removed by using a laser (S110). The laser may be a $CO_2$ laser having high power.

The second supporting member 86 is adhered to the third transparent member 6 (e.g., the silsesquioxane film 84) by an adhesive to protect the third transparent member 6. The second supporting member 86 is removed after forming the protective window 20.

While the present invention has been shown and described in connection with exemplary embodiments thereof, it is to be understood by those of ordinary skill in the art that various changes in form and detail may be made thereto without departing from the spirit and scope of the invention as defined by the following claims.

What is claimed is:

1. A method of manufacturing a protective window, the method comprising:
    preparing a high hardness film in which a first supporting member, a silsesquioxane film, and a second supporting member are deposited;
    pre-treating the high hardness film to form a pre-window; and
    forming a transparent member on a surface of the pre-window through an injection process, the transparent member formed of polycarbonate,
    wherein the first supporting member and the second supporting member are formed of polyethylene terephthalate or polyethylene naphthalate.

2. The method of claim 1, wherein the pre-treating is performed in a vacuum state and includes heating the high hardness film and mounting the high hardness film on a jig.

3. The method of claim 2, wherein the pre-window includes a curved surface.

4. The method of claim 1, wherein the pre-treating is performed in a vacuum state and includes heating a contact film, mounting the high hardness film on a jig, and bringing the high hardness film into contact with the contact film.

5. The method of claim 4, wherein the pre-window includes a curved surface.

6. The method of claim 1, wherein the pre-treating is performed at a temperature of from about 250° C. to about 500° C.

7. A method of manufacturing a window, the method comprising:
- forming a high hardness film by sequentially depositing a first supporting member, a silsesquioxane film, and a second supporting member;
- forming a pre-window by pre-treating the high hardness film;
- forming a transparent member on the first supporting member; and
- removing the second supporting member, wherein the first supporting member and the second supporting member are formed of polyethylene terephthalate or polyethylene naphthalate.

8. The method of claim 7, wherein a hard coating layer is formed between the first supporting member and the silsesquioxane film.

9. The method of claim 7, wherein protective films are formed on two opposite surfaces, respectively, of the high hardness film.

10. The method of claim 7, further comprising:
- removing the protective films; and
- forming a printing layer on the first supporting member.

* * * * *